United States Patent
Yu et al.

(10) Patent No.: US 9,604,510 B2
(45) Date of Patent: Mar. 28, 2017

(54) METHOD FOR SETTING MULTIPLE TPMS SENSORS

(71) Applicant: CUB ELECPARTS INC., Changhua County (TW)

(72) Inventors: San-Chuan Yu, Changhua County (TW); Tsan-Nung Wang, Changhua County (TW); Chi-Hung Chen, Changhua County (TW); Chao-Ching Hu, Tainan (TW)

(73) Assignee: CUB ELECPARTS INC., Changhua County (TW)

( * ) Notice: Subject to any disclaimer, the term of this patent is extended or adjusted under 35 U.S.C. 154(b) by 64 days.

(21) Appl. No.: 14/288,982

(22) Filed: May 28, 2014

(65) Prior Publication Data
US 2015/0239308 A1 Aug. 27, 2015

(30) Foreign Application Priority Data
Feb. 26, 2014 (TW) .............................. 103106601 A

(51) Int. Cl.
*B60C 23/04* (2006.01)
(52) U.S. Cl.
CPC ...... *B60C 23/0471* (2013.01); *B60C 23/0462* (2013.01); *B60C 23/0479* (2013.01)
(58) Field of Classification Search
CPC .................... B60C 23/0471; B60C 23/0433
USPC ...................................... 340/10.52, 442, 447
See application file for complete search history.

(56) References Cited

U.S. PATENT DOCUMENTS

| | | | | |
|---|---|---|---|---|
| 2003/0227379 A1* | 12/2003 | Itou | ..................... | B60C 23/0416 340/442 |
| 2005/0071057 A1* | 3/2005 | Lin | ..................... | B60C 23/0413 701/29.6 |
| 2008/0228045 A1* | 9/2008 | Gao | ..................... | A61B 5/0024 600/301 |
| 2012/0119895 A1* | 5/2012 | Deniau | ............... | B60C 23/0408 340/442 |
| 2014/0011455 A1* | 1/2014 | Hsu | ..................... | B60C 23/0479 455/41.3 |
| 2014/0122982 A1* | 5/2014 | Gavin | ................... | H03M 13/09 714/807 |
| 2014/0165026 A1* | 6/2014 | McIntyre | ............ | B60C 23/0471 717/100 |
| 2015/0015390 A1* | 1/2015 | McIntyre | ............ | B60C 23/0471 340/447 |
| 2015/0029016 A1* | 1/2015 | Lesesky | ................ | B60C 23/045 340/442 |

* cited by examiner

*Primary Examiner* — Joseph Feild
*Assistant Examiner* — Omar Casillashernandez
(74) *Attorney, Agent, or Firm* — Muncy, Geissler, Olds & Lowe, P.C.

(57) ABSTRACT

A TPMS (tire pressure monitoring system) sensor setting method is disclosed to use a setting tool for selecting the ID codes of multiple TPMS sensors and burning a communication protocol into the multiple selected TPMS sensors at a time, significantly shortening the operation time.

7 Claims, 3 Drawing Sheets

METHOD FOR SETTING MULTIPLE TPMS SENSORS

BACKGROUND OF THE INVENTION

1. Field of the Invention

The present invention relates to TPMS (tire pressure monitoring system) sensor installation and setting technology and more particularly, to an apparatus and method for setting multiple TPMS (tire pressure monitoring system) sensors at one time.

2. Description of the Related Art

At the present time, various commercial vehicles have a TPMS (tire pressure sensor system) sensor installed in each tire thereof. However, because every vehicle brand uses a different communication protocol, a particular communication protocol must be burned into each TPMS sensor after its installation. According to conventional techniques, a setting tool is used to burn the selected communication protocol to each installed TPMS sensor individually. So, if an user needs to install four TPMS sensors, the user needs to operate the setup process four times. Thus, it is complicated and time-consuming to burn a communication protocol into multiple TPMS sensors in a vehicle. An improvement is this regard is needed.

SUMMARY OF THE INVENTION

The present invention has been accomplished under the circumstances in view. It is the main object of the present invention to provide a TPMS sensor setting method, which is simple and capable of burning a communication protocol to multiple TPMS sensors at a time.

To achieve this and other objects of the present invention, a TPMS sensor setting method includes the step of providing a burning tool comprising a display unit, an input device, a low-frequency transmission unit and a wireless transmitter receiver unit, the step of operating the burning tool to transmit a trigger signal to TPMS sensors, enabling each TPMS sensor to feed back a response signal after receipt of the trigger signal, which response signal containing the ID code of the respective TPMS sensor, the step of enabling the burning tool to display on the display unit thereof the ID codes of all TPMS sensors that bed back the respective response signals to the burning tool, and the step of operating the input device of the burning tool to select the ID codes of the TPMS sensors and the communication protocol to be burned where the selected communication protocol contains the coding of the vehicle brand of the vehicle carrying the TPMS sensors, and then operating the burning tool to transmit the selected communication protocol to each selected TPMS sensor, enabling the selected communication protocol to be simultaneously burned into all the selected TPMS sensors.

Other advantages and features of the present invention will be fully understood by reference to the following specification in conjunction with the accompanying drawings, in which like reference signs denote like components of structure.

DETAILED DESCRIPTION OF THE INVENTION

Figure 1:
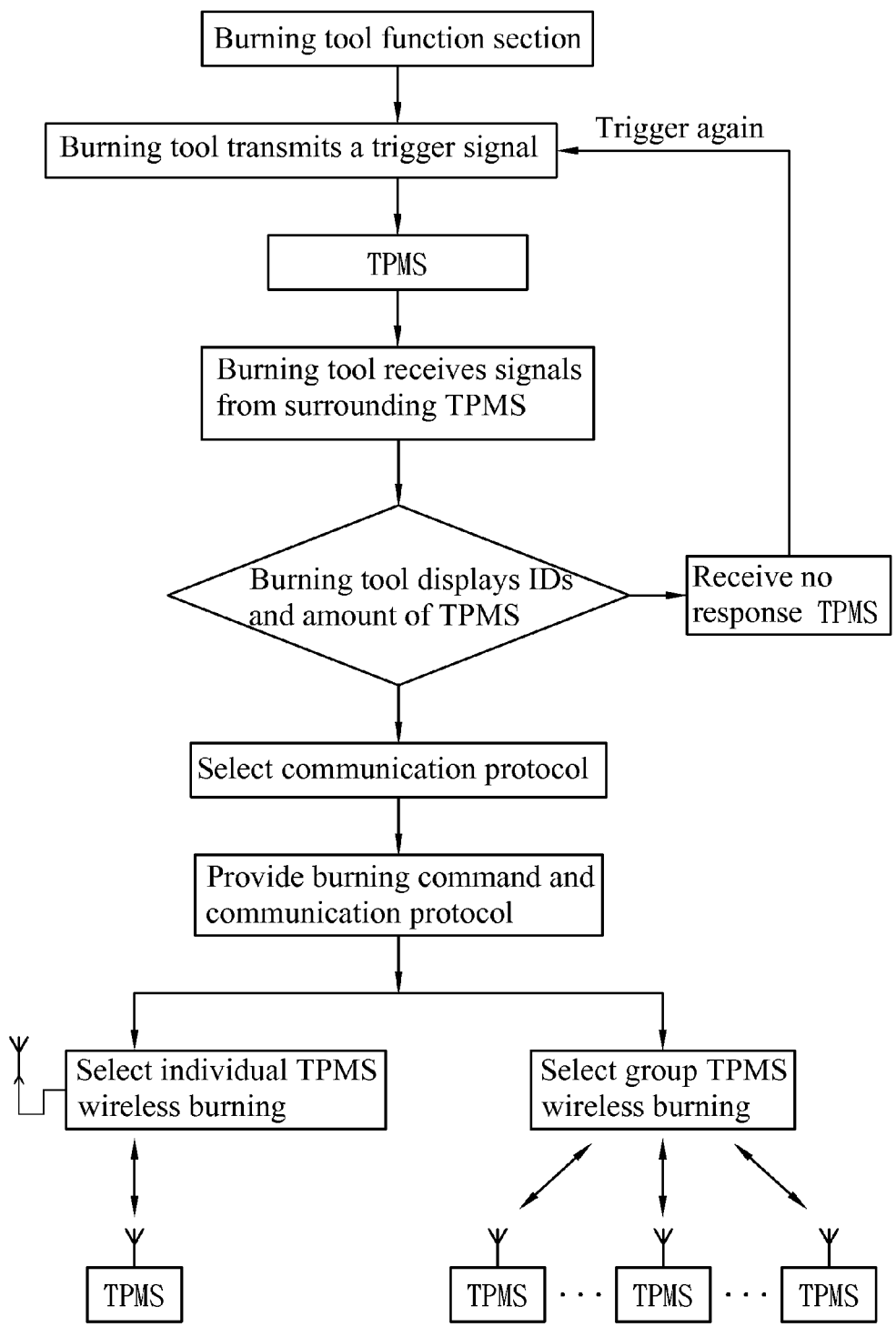
FIG. 1 is an operational flow chart of the present invention.

Referring to FIG. 1, a method for setting multiple TPMS (tire pressure monitoring system) sensors in accordance with the present invention comprises the following steps:

A. Provide a burning tool that comprises a display unit 11, an input device 12, a low-frequency transmission unit 23 and a wireless transmitter receiver unit 24.

B. Operate the burning tool to transmit a wireless trigger signal to all TPMS sensors within a predetermined range and to receive a response signal from each TPMS sensor, which response signal contains the ID code of the respective TPMS sensor.

C. After received all response signals from the TPMS sensors within the predetermined range, the burning tool displays the amount of the TPMS sensors and their ID codes on the display unit.

D. Operate the input device of the burning tool to select the amount of the TPMS sensors to be burned and their respective ID codes, and then to select the communication protocol to be burned that contains vehicle brand, year and model. Thereafter, operate the burning tool to transmit a burning command and the selected communication protocol to each selected TPMS sensor and to set a response time. The burning command can be transmitted by radio frequency, low frequency, wifi, infrared rays or blue tooth. Each TPMS sensor has a different response time. The communication protocol contains the depot coding. The communication protocol is burned to the selected TPMS sensors at the same time. For example, when using B brand's communication protocol, transmit a B brand coding. After received the communication protocol transmitted by the burning tool, every selected TPMS sensor will burn the communication protocol into the memory therein.

E. After burning, the burning tool provides a check command, enabling each TPMS sensor to feed back a check data after receipt of the check command, which check data containing the ID code of the respective TPMS sensor.

F. The burning tool starts up a checksum procedure after receipt of the check data of each TPMS sensor, ensuring successful completion of the burning operation and data correctness.

All the selected TPMS sensors will be continuously monitored during the burning operation, and the burning operation keeps running if the TPMS sensors keep providing the correct response. If there is any TPMS sensor give no response, re-send the communication protocol.

In the aforesaid step D, the burning tool transmits the communication protocol to each selected TPMS sensor individually. In the aforesaid step E, the burning tool can be controlled to transmit the check command to all the TPMS sensors after all the TPMS sensors finished the communication protocol burning operation, or alternatively, the burning tool can be controlled to transmit the check command to each individual TPMS sensor that finished the communication protocol burning operation.

In the aforesaid step D, the order of the communication protocol selection action and the TPMS sensor selection action is exchanged, i.e., the user can select the amount of the TPMS sensors and their respective ID codes and then select the communication protocol to be burned as stated in the aforesaid step D, or alternatively, the user can select the communication protocol to be burned and then select the amount of the TPMS sensors and their respective ID codes.

Figure 3:
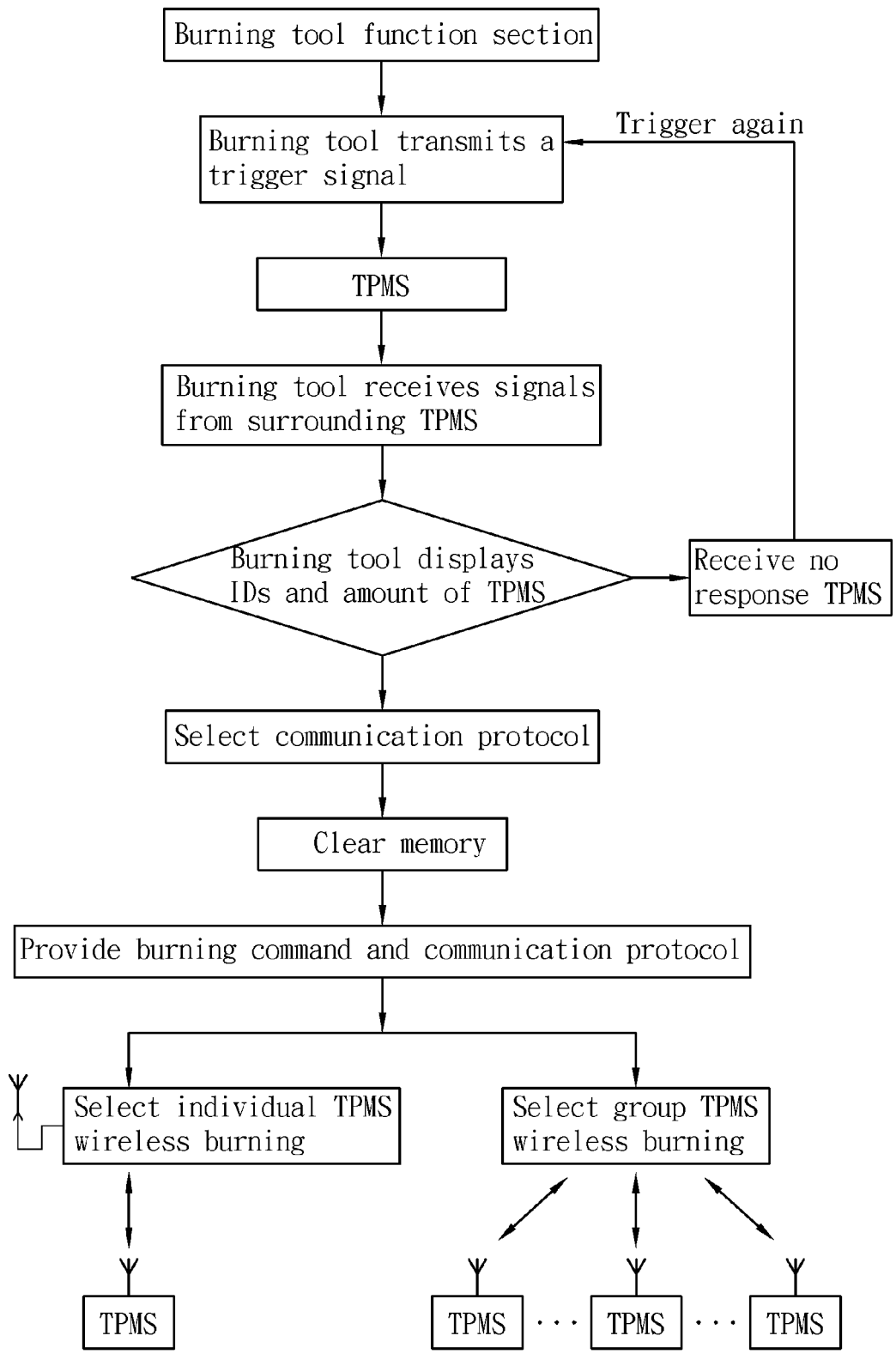
FIG. 3 is an alternate form of the operational flow chart of the present invention.

In an alternate form of the present invention as illustrated in FIG. 3, prior to the aforesaid step D, the setting tool can be controlled to provide to the selected TPMS sensors a clear command to clear the stored communication protocol from their memories, ensuring sufficient memory space for receiving the burning command and the provided communication protocol.

Figure 2:
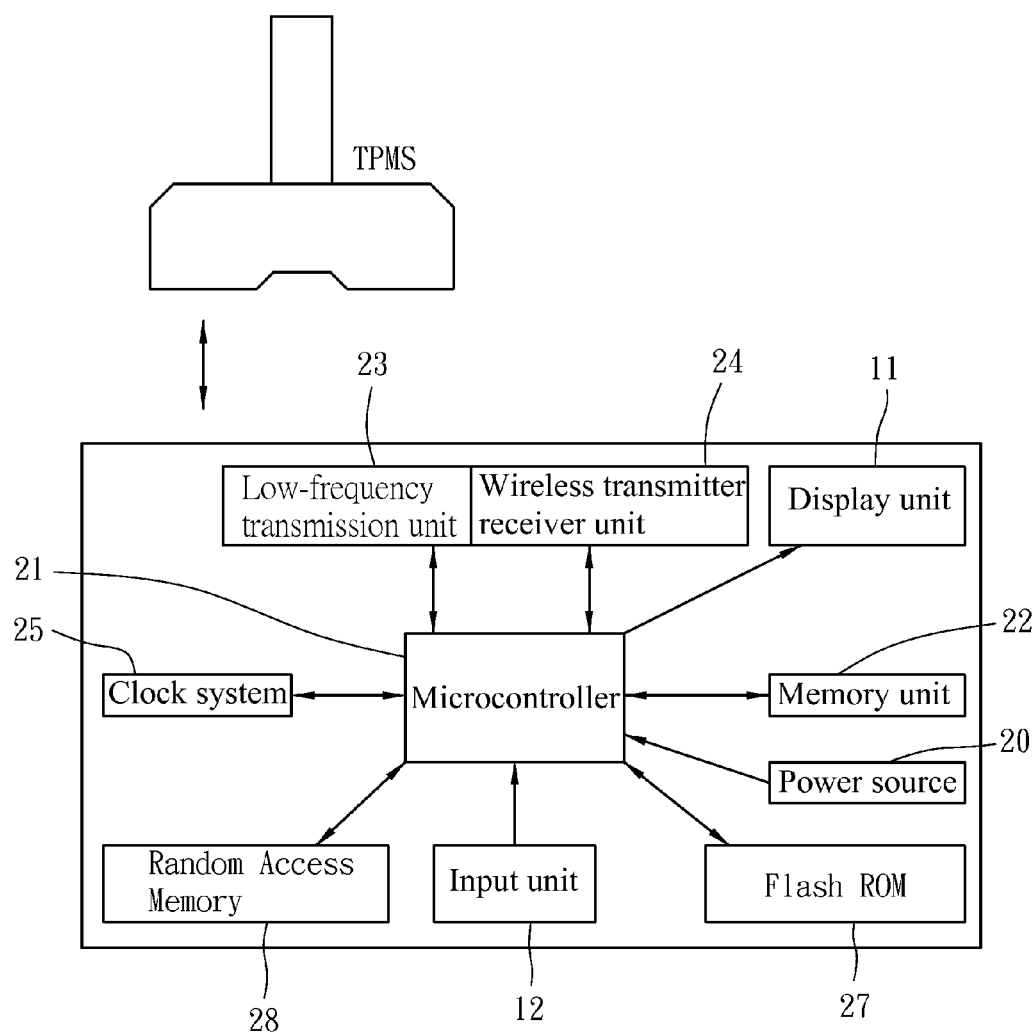
FIG. 2 is circuit function block diagram of the burning tool in accordance with the present invention.

Referring to FIG. 2, the circuit function block diagram of the burning tool is shown. As illustrated, the burning tool comprises:

a power source 20 adapted to provide with burning tool with the necessary working electricity;

a microcontroller 21 electrically coupled with the display unit 11 and the input device 12;

a memory unit 22 electrically coupled to the microcontroller 21 and adapted for storing at least one TPMS communication protocol;

a low-frequency transmission unit 23 electrically connected to the microcontroller 21 and adapted to work as interface means for the connection of an external device;

a wireless transmitter receiver unit (Radio frequency) 24 electrically coupled to the microcontroller 21;

a clock system 25 electrically coupled to the microcontroller 21;

a Flash ROM (read only memory) 27 electrically coupled to the microcontroller 21; and a Random Access Memory 28 electrically coupled to the microcontroller 21.

Subject to the application of the method of the present invention, the invention eliminates the drawbacks of the prior art method of individually burning a communication protocol into each individual TPMS sensor. The method of the present invention can burn a communication protocol into one or multiple TPMS sensors at one time, significantly shortening the operation time and bringing convenience to the user.

What is claimed is:

1. A TPMS (tire pressure monitoring system) sensor setting method, comprising:

providing a burning tool, said burning tool comprising a display unit, an input device, a low-frequency transmission unit and a wireless transmitter receiver unit;

operating said burning tool to transmit a trigger signal to TPMS sensors, enabling each TPMS sensor to feed back a response signal after receipt of the trigger signal, which response signal containing an ID code of the respective TPMS sensor;

said burning tool displaying on the display unit thereof ID codes of all TPMS sensors that fed back the respective response signals to said burning tool; and operating the input device of said burning tool to select the ID codes of the TPMS sensors and communication protocol to be burned where the selected communication protocol contains coding of a vehicle brand of a vehicle carrying the TPMS sensors, and then operating said burning tool to transmit the selected communication protocol to each selected TPMS sensor, enabling the selected communication protocol to be simultaneously burned into all the selected TPMS sensors without burning the ID codes.

2. The TPMS (tire pressure monitoring system) sensor setting method as claimed in claim 1, wherein the order of the selection of the ID codes of the selection of the TPMS sensors and the communication protocol in is exchangeable.

3. The TPMS (tire pressure monitoring system) sensor setting method as claimed in claim 1, wherein said burning tool is controlled to transmit a check command to each selected TPMS sensor after completion of the communication protocol burning operation, enable each selected TPMS sensor to feed back a check data after receipt of said check command, said check data containing the ID code of the respective TPMS sensor.

4. The TPMS (tire pressure monitoring system) sensor setting method as claimed in claim 3, wherein said burning tool starts up a checksum procedure after receipt of the check data of each selected TPMS sensor, ensuring successful completion of the burning operation and data correctness.

5. The TPMS (tire pressure monitoring system) sensor setting method as claimed in claim 3, wherein said burning tool transmits said check command to all the selected TPMS sensors after all the selected TPMS sensors finished the communication protocol burning operation.

6. The TPMS (tire pressure monitoring system) sensor setting method as claimed in claim 3, wherein said burning tool transmits said check command to each individual selected TPMS sensor after each individual selected TPMS sensor finished the communication protocol burning operation.

7. The TPMS (tire pressure monitoring system) sensor setting method as claimed in claim 1, further comprising operating said burning tool to transmit a clear command to all the selected TPMS sensors prior to said operating the input device, driving each selected TPMS sensor to clear memory means thereof.

* * * * *